3,066,695
CHECK VALVE
Arthur C. Allen, Chicago, Ill., assignor to Stewart-Warner Corporation, Chicago, Ill., a corporation of Virginia
Filed June 4, 1956, Ser. No. 589,027
1 Claim. (Cl. 137—512.15)

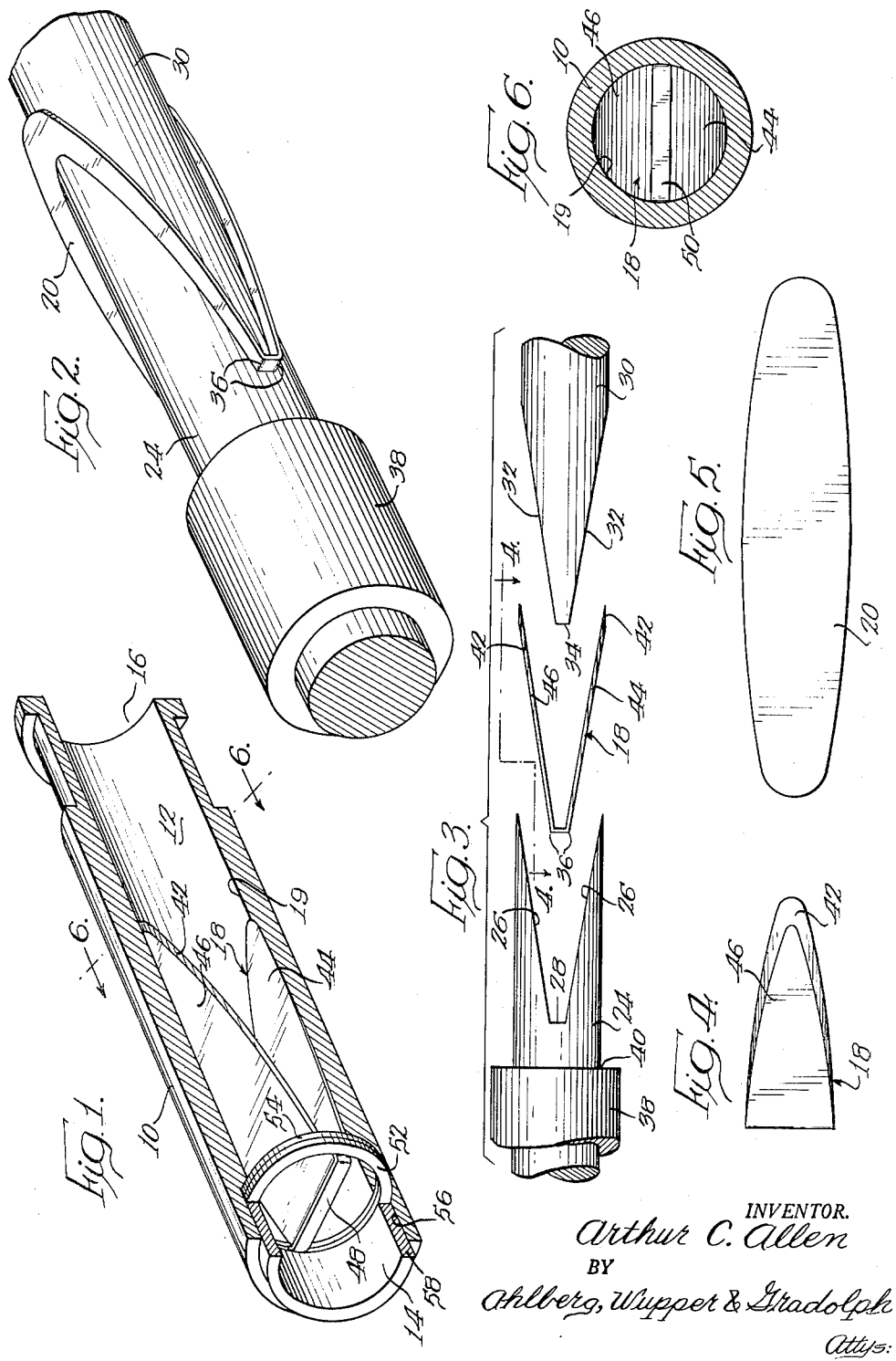

The present invention relates to an improved check valve.

One object of the invention is to provide for assuring only a unidirectional flow of fluid through a cylindrical bore an improved check valve of economical construction which provides for generally unrestricted straight line flow of fluid past the valve in a normal direction through the bore while remaining continuously in readiness to block reverse fluid flow through the bore by forming a fluid seal with the cylindrical surface defining the bore.

Another object is to provide an improved check valve of the above character which is practically silent in operation under all operating conditions.

Other objects and advantages will become apparent from the following description of the invention as illustrated in the drawings, in which:

FIGURE 1 is a partially sectioned perspective view of a valve constructed in accordance with the invention;

FIG. 2 is a perspective view illustrating the method by which component structure of the valve is made in accordance with the invention;

FIG. 3 is a partially exploded side view of structure used in practicing the method of the invention as illustrated in FIG. 2;

FIG. 4 is a plan view, taken along the line 4—4 of FIG. 3, of a flexible valve element fashioned in accordance with the invention and forming a basic component of the improved valve;

FIG. 5 is a plan view of a blank from which the basic valve element is fashioned in accordance with the invention; and FIG. 6 is a transverse sectional view of the valve taken along the line 6—6 of FIG. 1.

As shown in FIG. 1, the valve constructed in accordance with the invention is incorporated into an elongated body 10 defining a cylindrical valve bore 12 extending longitudinally therethrough between an inlet end 14 and an outlet end 16. The passage of fluid through the bore 12 is limited to a normal direction of flow from the inlet end 14 to the outlet end 16 by means of a flexible bore sealing element 18 which responds noiselessly to differential fluid pressure within the bore to either open up the bore to substantially unrestricted, straight-line flow of fluid in the normal direction or to block fluid flow in the opposite direction by forming an effective seal against the cylindrical surface 19 of the bore.

The bore sealing element 18 is formed from a flat elongated blank 20, FIG. 5, of a flexible material having physical qualities and a thickness (corresponding to that of the finished sealing element, FIG. 3) such that the blank and, hence, the sealing element have a significant capability to yieldably resist flexure by applied fluid pressure. As shown, the blank 20 is generally elliptical in shape.

Preferably, the blank 20 is cut from a flat sheet or strip of tetrafluoroethylene, a tough plastic material well suited for the purposes of the present invention by its physical qualities—particularly its capability of enduring repeated flexure under stress. Moreover, tetrafluoroethylene is well suited for valving the flow of petroleum fluids by its capability of retaining its physical qualities effectively undiminished by the presence of such fluids. Tetrafluoroethylene is commercially available under the trade name "Teflon" from E. I. du Pont de Nemours & Co., Inc., Arlington, New Jersey.

Roughly dimensioned, the blank 20 shown has a width somewhat greater than the diameter of the bore 12 and a length more than four times the bore diameter.

The blank 20 is fashioned into the valving element 18 in an extremely efficient manner which shapes the valve element properly for forming with the bore surface 19 a highly effective seal against the reverse flow of fluid through the bore 12. In broad outline, the valve element 18 is fashioned from the blank 20 by holding the blank firmly in a position simulating the position assumed by the valve element in sealing the bore 12 against the reverse flow of fluid and severing the marginal edge of the blank at its intersection with a cylindrical cutting surface simulating the surface 19 defining the bore.

Thus, a cylindrical blank holder 24, having a diameter equal to that of the bore 12, is formed at one end to define two symmetrical plane surfaces 26 diverging outwardly at equal acute angles to the extended axis of the holder and shaped substantially as mirror images of each other. The converging inner ends of the holder surfaces 26 terminate at a narrow, transverse bridging surface 28. As shown, each surface 26 has a length away from the surface 28 greater than twice the diameter of the holder 24.

Another cylindrical holder 30 equal in diameter to the holder 24 is formed at one end to define two plane surfaces 32 converging outwardly toward the extended axis of the holder at an angular relationship to each other corresponding to the angular relationship between the two surfaces 26 of the other holder. The holder 30 is truncated at the converging outer ends of the surfaces 32 to define a transverse bridging surface 34 somewhat more narrow than the bridging surface 28.

The two holders 24 and 30 thus formed are clamped longitudinally against opposite sides of the blank 20 to firmly support the blank as shown in FIG. 2. In its clamped position the blank 20 is turned generally end to end to form central transverse bends 36, FIG. 2, extending around the bridging surface 34 of the holder 30 and connecting the two longitudinal half-sections of the blank, which are clamped firmly between the holder surfaces 32 and the holder surfaces 26.

The dimensions of the blank 20 are such that the entire peripheral extent of the marginal edge of the blank projects beyond the adjacent cylindrical surfaces of the holders 24, 30, which are coaxial when clamped against the blank.

The projecting marginal edge of the blank 20 is cut off fully but only to the extent that it projects beyond the cylindrical surfaces of the holders 24, 30. This is accomplished by a single stroke of a circular cutter 38 formed to define on one end a circular cutting edge 40 dimensioned diametrically to closely encircle either of the holders 24, 30. The cutter 38 is translated from the position shown in FIG. 2 across the interfitting ends of the holders 24, 30 to shear off the marginal edges of the blank 20 flush with cylindrical path of movement of the cutting edge 40 and hence flush with the cylindrical surfaces of the holders 24, 30.

The peripheral edge of the valve element 18 thus formed from the blank is shaped as a segmental area 42 of a cylindrical surface corresponding to the bore surface 19 in its diametrical size and orientation relative to the valve element. Opposite ends of the valve element 18 constitute two valve blades 44, 46 of generally semi-elliptical shape which tend to diverge from each other, due to the resiliency of the material forming the valve element.

The finished valve element 18 is released from the holders 24, 30 and inserted into the valve bore 12 in a position such that both valve blades 44, 46 extend toward the outlet end of the bore without protruding from the bore, as shown in FIG. 1. As shown, each blade 44, 46 has a length greater than twice the diameter of the bore 12.

Central transverse support is provided to the bases of the two blades 44, 46 by clamping the central transverse portion of the valve element 18 between two narrow clamping members 48, 50 extending diametrically across the bore 12 in opposing relation to each other, FIGS. 1 and 6. Opposite ends of the two clamping members 48, 50 are integral respectively with two valve support rings 52, 54, FIG. 1, having inner diameters substantially equal to that of the bore 12. As shown, the two rings 52, 54 are held firmly together in a counterbore 56 at the inlet end of the bore 12 by a cylindrical insert 58 pressed into the counterbore.

Thus supported, the two valve blades 44, 46 operate silently in response to differential fluid pressure in the bore 12 to limit the passage of fluid through the bore to a substantially unrestricted flow in a normal direction from the inlet 14 to the outlet 16. Only a very slight increase in fluid pressure at the bore inlet 14 relative to the pressure at the bore outlet 16 causes the blades 44, 46 to swing toward each other to open the bore to a laminar, straight-line flow of fluid toward the outlet 16, this normal direction of flow being substantially unrestricted by the narrow valve supports 48, 50.

On the other hand, a change in differential fluid pressure in the bore 12 tending to produce fluid flow in the reverse direction is met immediately by swinging of the blades 44, 46 away from each other to effect surface contact between the peripheral surface areas 42 of the blades and the opposing surface 19 defining the bore. In blocking reverse flow in this manner, the valve blades 44, 46 form a seal against the bore surface which is made extremely effective by the previously described shaping of blade surfaces 42.

Not only is the valving action thus provided extremely efficient, but it is practically silent under all operating conditions.

While I have shown a preferred embodiment of my invention, it will be apparent that numerous variations and modifications thereof may be made without departing from the underlying principles and scope of the invention. I therefore desire, by the following claim, to include all such variations and modifications by which substantially the results of my invention may be obtained through the use of substantially the same or equivalent means.

I claim:

A check valve capable of passing liquid freely through the valve in a normal direction with a minimum of liquid friction comprising: in combination, a body defining a cylindrical bore of substantial length having a liquid inlet and a liquid outlet end; narrow valve support means mounted on said body between said ends thereof in a location therealong spaced a substantial distance from said outlet end thereof, said support means comprising a pair of valve support rings having an inner diameter approximately that of said bore, said valve further including means supporting said rings on said body in opposing relation to each other and in encircling relation to said bore, said valve support means further including two narrow clamping members being integral with said respective rings and extending diametrically thereacross in opposing relation to each other; a flat valve element of generally elliptical shape formed of a flexible material having significant resistance to flexure, said valve element having a width along the minor axis thereof approximately equal to the diameter of said bore and a length along the major axis thereof in the order of four times the diameter of said bore, said valve element being clamped by said narrow clamp members along the minor axis thereof with the opposite ends of said valve element constituting valve blades extending away from said narrow valve support means to swing toward each other in response to differential liquid pressure in the bore tending to cause liquid flow toward the outlet end thereof and to swing away from each other to effect a liquid tight seal between the marginal edges of said blades in the adjacent surface of said bore in response to differential liquid pressure tending to cause liquid flow through the bore toward said inlet end thereof, the peripheral edges of both blades extending away from said support means and being shaped to define surface areas shaped as segments of a cylinder concentric with the axis of said bore and having a radius of curvature equal to the radius of said bore, whereby said peripheral blade areas are adapted to make wide surface contact with the opposing surface of said bore.

References Cited in the file of this patent

UNITED STATES PATENTS

| | | |
|---|---|---|
| 1,306,391 | Romanoff | June 10, 1919 |
| 2,045,327 | Laemmel | June 23, 1936 |
| 2,236,320 | Mosel | Mar. 25, 1941 |
| 2,292,003 | Yant | Aug. 4, 1942 |
| 2,689,352 | Sabo | Aug. 17, 1954 |